United States Patent
Fukasawa

(10) Patent No.: US 10,307,739 B2
(45) Date of Patent: Jun. 4, 2019

(54) CATALYST FOR HYDROCRACKING AND HYDROCARBON PRODUCTION METHOD

(71) Applicant: IDEMITSU KOSAN CO., LTD., Tokyo (JP)

(72) Inventor: Shun Fukasawa, Chiba (JP)

(73) Assignee: IDEMITSU KOSAN CO., LTD., Tokyo (JP)

( * ) Notice: Subject to any disclaimer, the term of this patent is extended or adjusted under 35 U.S.C. 154(b) by 0 days.

(21) Appl. No.: 15/102,749

(22) PCT Filed: Dec. 10, 2014

(86) PCT No.: PCT/JP2014/082760
§ 371 (c)(1),
(2) Date: Jun. 8, 2016

(87) PCT Pub. No.: WO2015/087938
PCT Pub. Date: Jun. 18, 2015

(65) Prior Publication Data
US 2016/0310932 A1   Oct. 27, 2016

(30) Foreign Application Priority Data
Dec. 11, 2013   (JP) .................... 2013-255953

(51) Int. Cl.
| | | |
|---|---|---|
| *B01J 23/883* | (2006.01) | |
| *C10G 3/00* | (2006.01) | |
| *B01J 29/08* | (2006.01) | |
| *B01J 29/70* | (2006.01) | |
| *B01J 37/00* | (2006.01) | |
| *B01J 37/02* | (2006.01) | |

(52) U.S. Cl.
CPC ........... *B01J 23/883* (2013.01); *B01J 29/084* (2013.01); *B01J 29/7007* (2013.01); *B01J 37/0036* (2013.01); *B01J 37/0201* (2013.01); *C10G 3/46* (2013.01); *C10G 3/49* (2013.01); *C10G 3/50* (2013.01); *Y02P 30/20* (2015.11)

(58) Field of Classification Search
CPC ................................................ B01J 23/883
See application file for complete search history.

(56) References Cited

U.S. PATENT DOCUMENTS

| | | | | |
|---|---|---|---|---|
| 3,513,086 A * | 5/1970 | Kay | ........................ | C10G 47/12 208/112 |
| 3,781,199 A | 12/1973 | Ward | | |
| 4,485,183 A * | 11/1984 | Miller | ..................... | B01J 23/94 208/216 R |
| 4,816,538 A | 3/1989 | Abdo | | |
| 5,350,501 A | 9/1994 | Ward | | |
| 6,858,128 B1 * | 2/2005 | Hoehn | .................... | C10G 47/00 208/107 |
| 2007/0135300 A1 | 6/2007 | Kagami et al. | | |
| 2012/0216449 A1 | 8/2012 | Hayasaka et al. | | |
| 2012/0323056 A1 | 12/2012 | Lee et al. | | |
| 2013/0184505 A1 * | 7/2013 | Maxwell | ................. | C10G 1/02 585/240 |

FOREIGN PATENT DOCUMENTS

| | | | | |
|---|---|---|---|---|
| CA | 2 854 709 A1 | 5/2013 | | |
| CN | 102218324 A | 10/2011 | | |
| EP | 2781580 A1 * | 9/2014 | ............... | C10L 1/04 |
| JP | 2001-510132 A | 7/2001 | | |
| JP | 2010-209330 A | 9/2010 | | |
| JP | 2011-052077 A | 3/2011 | | |
| WO | WO2011/053166 | * | 5/2011 | |
| WO | WO-2013/073529 A1 | 5/2013 | | |

OTHER PUBLICATIONS

Extended European Search Report dated Jul. 4, 2017 in European Patent Application No. 14869123.1.
Japanese Office Action dated Sep. 11, 2018 in corresponding application No. 2015-552493.
Chen et al., "Single-step Hydroconversion of Jatropha Oil to High Quality Fuel Oil over Reduced Nickel-Molybdenum Catalysts," Journal of Japan Petroleum Institute, vol. 56(4), pp. 249-252 (2013).
Guo et al., "Effect of Mo Promoter Content on Performance of Mo—$Ni_2P$/SBA-15/Codierite Monolithic Catalyst for Hydrodesulfurization," Chinese Journal of Catalysis, vol. 31(3), pp. 329-334 (2010).
Ruinart De Brimont et al., "Deoxygenation mechanisms on Ni-promoted $MoS_2$ bulk catalysts: A combined experimental and theoretical study," Journal of Catalysis, vol. 286, pp. 153-164 (2012).
Wang et al., "Characterization of Active Sites over Reduced Ni—Mo/$Al_2O_3$ Catalysts for Hydrogenation of Linear Aldehydes," J. Phys. Chem. B., vol. 109(5), pp. 1882-1890 (2005).
International Search Report for PCT/JP2014/082760 dated Mar. 17, 2015.

(Continued)

*Primary Examiner* — Douglas B Call
(74) *Attorney, Agent, or Firm* — Foley & Lardner LLP

(57) ABSTRACT

The present invention is to provide a catalyst for hydrocracking that is capable of decreasing the content of oxygen components contained in hydrocarbons synthesized from a vegetable fat or oil, an animal fat or oil, and/or a coal liquefaction oil each containing at least one selected from a fatty acid, a fatty acid ester, and an alkylphenol compound, and a hydrocarbon production method using the same. The catalyst for hydrocracking of the present invention contains a carrier containing a porous oxide, and nickel and molybdenum supported on the carrier, the catalyst for hydrocracking being subjected to a hydrogen reduction treatment, and having a mass ratio (X/(X+Y)) of a nickel content (X) in terms of nickel oxide (NiO) to the sum of the nickel content (X) in terms of nickel oxide (NiO) and a molybdenum content (Y) in terms of molybdenum oxide ($MoO_3$) of 0.5 or more and 0.9 or less. The hydrocarbon production method of the present invention includes producing hydrocarbons from a vegetable fat or oil, an animal fat or oil, and/or a coal liquefaction oil each containing at least one selected from a fatty acid, a fatty acid ester, and an alkylphenol compound, by using the catalyst for hydrocracking of the present invention.

6 Claims, No Drawings

(56) References Cited

OTHER PUBLICATIONS

Magee, et al., "Petroleum Catalysis in Nontechnical Language"; Jul. 2010; 8 pages.
Xingmei, "Catalysts for Industrial Applications"; Aug. 2004; 6 pages.
Machine Translation of Chinese Office Action re Application No. 201480066857.7; 9 pages.
Chinese Office Action dated Mar. 1, 2019 in corresponding application No. 201480066857.1.
Ding Zhong-Hao et al, Recycle and reuse of solid and gaseous wastes, National Defense Industry Press, 6 pgs.
Indian Office Action dated Mar. 8, 2019 in corresponding application No. 201647019794.

* cited by examiner

CATALYST FOR HYDROCRACKING AND HYDROCARBON PRODUCTION METHOD

CROSS-REFERENCE TO RELATED APPLICATIONS

The present application is a U.S. national stage application claiming the benefit of International Patent Application No. PCT/JP2014/082760, filed Dec. 10, 2014, which claims the benefit of priority to Japanese Patent Application No. 2013-255953, filed Dec. 11, 2013, the entireties of which are hereby incorporated by reference.

TECHNICAL FIELD

The present invention relates to a catalyst for hydrocracking used for producing hydrocarbons from a vegetable fat or oil, an animal fat or oil, and/or a coal liquefaction oil, and a hydrocarbon production method using the catalyst for hydrocracking.

BACKGROUND ART

The utilization of a biomass feedstock as a light gas oil fuel, a jet fuel and the like is significantly effective for decreasing the emission amount of carbon dioxide. However, there is concern that a light gas oil fuel, a jet fuel and the like that are produced by utilizing a biomass feedstock would contain oxygen components and subsequently the oxygen components would exert a bad influence to an internal-combustion engine. Accordingly, there have been attempts to produce a hydrocarbon by directly hydrocracking a biomass feedstock by using a catalyst containing a porous carrier, such as alumina, having supported thereon Mo, to which a metal, such as Ni, is added for activating Mo (i.e., a NiMo catalyst) (see, for example, PTL 1 and NPLs 1 to 3).

PTL 1 and NPL 1 describe the production of hydrocarbons by hydrocracking a fat or an oil derived from a vegetable or an animal containing at least one of a triacylglycerol and a fatty acid by using a NiMo catalyst subjected to a sulfurization treatment in advance, and also describe that the selectivity of the reaction route of the deoxidation reaction is enhanced by controlling the Ni/Mo atomic ratio in the NiMo catalyst. NPL 2 describes the application of a NiMo catalyst subjected to a reduction treatment, but not a sulfurization treatment, to a triacylglycerol. However, the mass ratio (X/(X+Y)) of the nickel content (X) in terms of nickel oxide (NiO) to the sum of the nickel content (X) in terms of nickel oxide (NiO) and the molybdenum content (Y) in terms of molybdenum oxide ($MoO_3$) described therein is only around 0.15, which is said to be optimal for a NiMo catalyst subjected to a sulfurization treatment in advance. NPL 3 describes the relationship between the reduction state of a NiMo catalyst subjected to a reduction treatment and the reactivity of the NiMo catalyst to a fat or an oil. However, NPL 3 does not describe or suggest the relationship between the mass ratio (X/(X+Y)) of the nickel content (X) in terms of nickel oxide (NiO) to the sum of the nickel content (X) in terms of nickel oxide (NiO) and the molybdenum content (Y) in terms of molybdenum oxide ($MoO_3$) of the NiMo catalyst, and the reactivity of the NiMo catalyst to a fat or an oil.

CITATION LIST

Patent Literature

PTL 1: JP 2010-209330 A

Non-Patent Literatures

NPL 1: M. Ruinart de Brimont, et al., Journal of Catalysis, Vol. 286, pp. 153-164 (2012)
NPL 2: Ning Chen, et al., Journal of Japan Petroleum Institute, Vol. 56(4), pp. 249-253 (2013)
NPL 3: Xueqin Wang, et al., Journal of Physical Chemistry B, Vol. 109, pp. 1882-1890 (2005)

SUMMARY OF INVENTION

Technical Problem

However, the aforementioned techniques cannot sufficiently enhance the deoxidation activity in the case of using a biomass feedstock and a coal liquefaction oil. The present invention has been made in view of the circumstances, and an object thereof is to provide a catalyst for hydrocracking that is capable of decreasing the content of oxygen components contained in hydrocarbons synthesized from a vegetable fat or oil, an animal fat or oil, and/or a coal liquefaction oil each containing at least one selected from a fatty acid, a fatty acid ester, and an alkylphenol compound, and a hydrocarbon production method using the same.

Solution to Problem

It has been believed that the proportion of Ni that is preferred for deoxidation reaction of oil and fat in a NiMo catalyst subjected to a sulfurization treatment can be applied directly to the proportion of Ni in a NiMo catalyst subjected to a reduction treatment. However, the present inventor has found that the range of the proportion of Ni preferred for deoxidation reaction of oil and fat in a NiMo catalyst subjected to a reduction treatment is different from the range in a NiMo catalyst subjected to a sulfurization treatment, and thus has completed the present invention. Thus, the present invention is as follows.

[1] A catalyst for hydrocracking, containing a carrier containing a porous oxide, and nickel and molybdenum supported on the carrier, the catalyst for hydrocracking being subjected to a hydrogen reduction treatment, and having a mass ratio (X/(X+Y)) of a nickel content (X) in terms of nickel oxide (NiO) to the sum of the nickel content (X) in terms of nickel oxide (NiO) and a molybdenum content (Y) in terms of molybdenum oxide ($MoO_3$) of 0.5 or more and 0.9 or less.

[2] A catalyst for hydrocracking, containing a carrier containing a porous oxide, and nickel and molybdenum supported on the carrier, the catalyst for hydrocracking having a mass ratio (X/(X+Y)) of a nickel content (X) in terms of nickel oxide (NiO) to the sum of the nickel content (X) in terms of nickel oxide (NiO) and a molybdenum content (Y) in terms of molybdenum oxide ($MoO_3$) of 0.5 or more and 0.9 or less, and having a content of sulfur of 5% by mass or less based on the total amount of the catalyst.

[3] The catalyst for hydrocracking according to the item [1] or [2], wherein the porous oxide is at least one of alumina and a solid acid oxide, and the solid acid oxide is at least one selected from the group consisting of zeolite, silica-alumina, alumina-boria, alumina-titania, silica-zirconia, and silicoaluminop hosp hate.

[4] The catalyst for hydrocracking according to the item [3], wherein the alumina is γ-alumina.

[5] The catalyst for hydrocracking according to the item [3] or [4], wherein the porous oxide contains a solid acid oxide.

[6] The catalyst for hydrocracking according to the item [5], wherein a mass ratio of the solid acid oxide is 10% by mass or more based on the total amount of the catalyst.

[7] A hydrocarbon production method, which includes producing hydrocarbons from a vegetable fat or oil, an animal fat or oil, and/or a coal liquefaction oil each containing at least one selected from a fatty acid, a fatty acid ester, and an alkylphenol compound, by using the catalyst for hydrocracking according to any one of the items [1] to [6].

Advantageous Effects of Invention

According to the present invention, there can be provided a catalyst for hydrocracking that is capable of decreasing the content of oxygen components contained in hydrocarbons synthesized from a vegetable fat or oil, an animal fat or oil, and/or a coal liquefaction oil each containing at least one selected from a fatty acid, a fatty acid ester, and an alkylphenol compound, and a hydrocarbon production method using the same.

DESCRIPTION OF EMBODIMENTS

Catalyst for Hydrocracking

The catalyst for hydrocracking of the present invention contains a carrier containing a porous oxide, and nickel and molybdenum supported on the carrier, and the catalyst for hydrocracking is subjected to a hydrogen reduction treatment, has a mass ratio ($X/(X+Y)$) of a nickel content (X) in terms of nickel oxide (NiO) to the sum of the nickel content (X) in terms of nickel oxide (NiO) and a molybdenum content (Y) in terms of molybdenum oxide ($MoO_3$) of 0.5 or more and 0.9 or less, and has a content of sulfur of 5% by mass or less based on the total amount of the catalyst. The catalyst for hydrocracking of the present invention will be described in detail below.

Carrier

The carrier used in the present invention is a porous oxide. The porous characteristics, such as the specific surface area, the average pore diameter, and the pore diameter distribution, of the porous oxide are not particularly limited, as far as nickel and molybdenum described later can be supported thereon. The porous oxide preferably is at least one of alumina and a solid acid oxide, and more preferably contains a solid acid oxide, since the content of oxygen components of the hydrocarbon produced by using the catalyst for hydrocracking can be further decreased. The porous oxide used may be alumina solely, a solid acid oxide solely, or a mixture of alumina and a solid acid oxide. The solid acid oxide herein is a solid matter that exhibits sites showing acidity (acid sites) exhibited on the surface thereof.

Alumina that is preferred for the carrier is γ-alumina due to the large specific surface area thereof. Examples of the solid acid oxide that is preferred for the carrier include zeolite, silica-alumina, alumina-boria, alumina-titania, silica-zirconia, and silicoaluminophosphate since the content of oxygen components of the hydrocarbon produced by using the catalyst for hydrocracking can be further decreased. These materials may be used solely or as a mixture of two or more kinds thereof. Examples of preferred zeolite include BEA-type zeolite (β-zeolite), FAU-type zeolite (Y-type zeolite), ultrastable Y-type zeolite (USY zeolite) formed by ultrastabilizing Y-type zeolite by a steaming treatment and an acid treatment, iron-containing USY zeolite (Fe-USY zeolite) containing iron, MOR-type zeolite, and MFI-type zeolite. These materials may be used solely or as a mixture of two or more kinds thereof. Among these kinds of zeolite, β-zeolite is more preferred.

In the case where the porous oxide contains a solid acid oxide, the ratio of the solid acid oxide with respect to the mass of the porous oxide is preferably 10% by mass or more and 100% by mass or less, more preferably 30% by mass or more and 80% by mass or less, and further preferably 50% by mass or more and 70% by mass or less, since the content of oxygen components of the hydrocarbon produced by using the catalyst for hydrocracking can be further decreased. When the content of the solid acid oxide is 10% by mass or more, the excessive decrease of the catalyst activity can be suppressed, and when it is 100% by mass or less, the decrease of the strength of the catalyst due to the small amount of the binder or the decrease of the catalyst activity due to the coking during the reaction can be suppressed.

Nickel and Molybdenum

The carrier used in the present invention supports nickel and molybdenum as metals. The mass ratio of the content (X) of nickel supported on the carrier in terms of nickel oxide (NiO) to the sum of the content (X) of nickel supported on the carrier in terms of nickel oxide (NiO) and the content (Y) of molybdenum supported on the carrier in terms of molybdenum oxide ($MoO_3$) is 0.5 or more and 0.9 or less, more preferably 0.5 or more and 0.8 or less, and further preferably 0.55 or more and 0.75 or less, since the content of oxygen components of the hydrocarbon produced by using the catalyst for hydrocracking can be decreased. When the mass ratio of the content (X) of nickel supported on the carrier in terms of nickel oxide (NiO) is less than 0.5, there may be a case where molybdenum is not sufficiently activated in the hydrogen reduction treatment described later, and when the mass ratio of the content (X) of nickel supported on the carrier in terms of nickel oxide (NiO) is larger than 0.9, there may be a case where the reactivity of the catalyst for hydrocracking is insufficient due to the small amount of molybdenum as an active species. The content (X) of nickel supported on the carrier in terms of nickel oxide (NiO) is the mass of nickel oxide (NiO) assuming that supported nickel is entirely nickel oxide (NiO), and the content (Y) of molybdenum supported on the carrier in terms of molybdenum oxide ($MoO_3$) is the mass of molybdenum oxide ($MoO_3$) assuming that supported molybdenum is entirely molybdenum oxide ($MoO_3$).

The ratio of the total mass of nickel and molybdenum is preferably 5% by mass or more and 40% by mass or less, and more preferably 15% by mass or more and 25% by mass or less, based on the total amount of the catalyst. When the ratio of the total mass of nickel and molybdenum is 5% by mass or more and 40% by mass or less, a sufficient catalyst activity is exhibited, and the decrease of the catalyst activity based on the amount of the supported metals due to aggregation of the metal species can be suppressed.

Hydrogen Reduction Treatment

The catalyst for hydrocracking of the present invention is subjected to a hydrogen reduction treatment in advance for activating the catalyst for hydrocracking. Specifically, the catalyst for hydrocracking of the present invention is reduced by using hydrogen in advance before use. For example, the hydrogen reduction treatment may be performed by reducing the catalyst for hydrocracking in a hydrogen atmosphere with a hydrogen partial pressure of 0.1 MPa or more and 6.0 MPa or less at a reaction temperature of 300° C. or more and 700° C. or less for 1 hour or more and 48 hours or less. When the reduction temperature is too low, the catalyst activity may be low due to insufficient reduction, and when the reduction temperature is too high, the activity may be low due to sintering occurring by heat. When the reduction time is too short, the catalyst activity may be low due to insufficient reduction, and when the reduction time is too long, the activity may be low due to sintering occurring by heat.

The catalyst for hydrocracking can be activated by a sulfurization treatment. In this case, however, it is necessary to introduce a sulfur compound, such as hydrogen sulfide, for the sulfurization treatment, to introduce continuously a sulfur compound to the reaction system for retaining the catalyst activity, and to remove hydrogen sulfide from hydrocarbons formed, and thus the process steps for producing hydrocarbons from oil and fat are increased as compared to the case of the hydrogen reduction treatment.

As described above, in the catalyst for hydrocracking of the present invention, a hydrogen reduction treatment is performed instead of a sulfurization treatment. Accordingly, the catalyst for hydrocracking after subjecting to the hydrogen reduction treatment contains substantially no sulfur. For example, the content of sulfur of the catalyst for hydrocracking after subjecting to the hydrogen reduction treatment may be 5% by mass or less, more preferably 1% by mass or less, and further preferably 0.1% by mass or less.

Meanwhile, the catalyst for hydrocracking of the present invention contains a carrier containing a porous oxide, and nickel and molybdenum supported on the carrier, and may have a mass ratio (X/(X+Y)) of a nickel content (X) in terms of nickel oxide (NiO) to the sum of the nickel content (X) in terms of nickel oxide (NiO) and a molybdenum content (Y) in terms of molybdenum oxide ($MoO_3$) of 0.5 or more and 0.9 or less, and a content of sulfur of 5% by mass or less based on the total amount of the catalyst, and the measure for achieving the low sulfur content is not particularly limited. For example, the low sulfur content can be achieved by not performing a sulfurization treatment using hydrogen sulfide or the like as an activation treatment of the catalyst, or by managing the sulfur concentration in the reaction raw materials.

Production Method of Catalyst for Hydrocracking

The catalyst for hydrocracking of the present invention is produced, for example, by subjecting a catalyst precursor, which is prepared by supporting nickel and molybdenum on a carrier, to a hydrogen reduction treatment. In the present invention, a material obtained by supporting an active metal species on a carrier and then calcining before subjecting to a pretreatment, such as a hydrogen reduction treatment or a sulfurization treatment, is referred to as a catalyst precursor.

Examples of the method for preparing the catalyst precursor by supporting nickel and molybdenum on the carrier include an impregnation method. The impregnation method is such a method that the carrier is impregnated with a solution of nickel and molybdenum, and then dried and calcined. On impregnating the carrier with a solution of nickel and molybdenum, the solution of nickel and molybdenum may contain phosphoric acid and/or a carboxylic acid compound for enhancing the dispersibility of nickel and molybdenum in the carrier. Examples of the carboxylic acid compound include citric acid, malic acid, tartaric acid, and gluconic acid.

The catalyst precursor thus prepared is subjected to the aforementioned hydrogen reduction treatment, and thus the catalyst for hydrocracking of the present invention is completed.

Hydrocarbon Production Method

The hydrocarbon production method of the present invention includes producing a hydrocarbon from a vegetable fat or oil, an animal fat or oil, and/or a coal liquefaction oil each containing at least one selected from a fatty acid, a fatty acid ester, and an alkylphenol compound, by using the catalyst for hydrocracking of the present invention. The hydrocarbon production method of the present invention will be described below. The vegetable fats or oils, the animal fats or oils, and the coal liquefaction oils exemplified below may be used solely or as a combination of two or more kinds thereof.

Vegetable Fat or Oil and Animal Fat or Oil

The vegetable fat or oil and the animal fat or oil are a fat or an oil that is obtained by expressing the same from an animal or vegetable raw material or by extracting the same with an organic solvent, and one obtained from a vegetable is referred to as a vegetable fat or oil, whereas one obtained from an animal is referred to as an animal fat or oil. Examples of the vegetable fat or oil include a coconut oil, a palm kernel oil, a palm oil, a cacao butter, a flaxseed oil, a safflower oil, a sesame seed oil, a tung oil, a cotton seed oil, a canola oil, a sesame oil, a corn oil, a soybean oil, a sunflower oil, a kapok oil, an olive oil, a mustard oil, a peanut oil, a castor oil, a camellia oil, a jatropha oil, a camelina oil, a carinata oil, a mandarin oil, and an oil produced by a particular microalga. The particular microalga means an alga that has a capability of converting a part of the nutritive substance in the body to the form of a hydrocarbon, or a fat or an oil, and examples thereof include *Aurantiochytrium*, *Botryococcus braunii*, *Pseudochoricystis ellipsoidea*, *Chlorella*, *Scenedesmus*, *Spirulina*, and *Euglena*. It has been known that *Aurantiochytrium* and *Botryococcus braunii* produce hydrocarbons that partially contain fats or oils, and *Pseudochoricystis ellipsoidea*, *Chlorella*, *Scenedesmus*, *Spirulina*, and *Euglena* produce fats or oils. Examples of the animal fat or oil include a bovine milk fat, a caprine milk fat, a buffalo milk fat, a beef fat, a lard, a mutton fat, a fish oil, a liver oil, and a neatsfoot oil. In this description, an oily liquid that is obtained by expressing the same from an animal or vegetable raw material or by extracting the same with an organic solvent is encompassed by the vegetable fat or oil and the animal fat or oil. Examples of the oily liquid include a cashew nut shell oil.

The vegetable fat or oil and the animal fat or oil contain, for example, at least one selected from a fatty acid and a fatty acid ester. The vegetable fat or oil and the animal fat or oil may particularly contain a glyceride containing a glycerin of a trihydric alcohol having three hydroxyl groups (—OH) and a fatty acid bonded to each other. The glyceride contained in the vegetable fat or oil and the animal fat or oil contains, for example, a triacylglycerol as a major component. The vegetable fat or oil and the animal fat or oil may further contain a free fatty acid, a fatty acid monoglyceride, and a fatty acid diglyceride. The vegetable fat or oil and the animal fat or oil may contain a fatty acid, particularly a fatty acid having from 3 to 40 carbon atoms. The vegetable fat or oil and the animal fat or oil may contain an alkylphenol compound. For example, a cashew nut shell oil is the vegetable fat or oil that contains an alkylphenol having an alkyl chain having 15 carbon atoms as a major component.

Coal Liquefaction Oil

According to the hydrocarbon production method of the present invention, hydrocarbons can be also produced from a coal liquefaction oil, in addition to the vegetable fat or oil and the animal fat or oil. The coal liquefaction oil is a liquid oil obtained by subjecting coal to a high temperature treatment or a thermal decomposition treatment in the presence of hydrogen, steam, oxygen (air) or the like. According to the hydrocarbon production method of the present invention, the content of oxygen components contained in the hydrocarbon can be decreased, and therefore among the coal liquefaction oils, an oxygen-containing oil, for example, a liquefaction oil that contains an alkylphenol compound remaining, is preferred for the hydrocarbon production method of the present invention.

Production of Hydrocarbon

In the hydrocarbon production method of the present invention, for example, the aforementioned fat or oil is made in contact with the catalyst for hydrocracking of the present invention in the presence of hydrogen. The reaction pressure (hydrogen partial pressure) in the production of hydrocarbons is preferably 1 MPa or more and 10 MPa or less, and more preferably 3 MPa or more and 6 MPa or less. When the reaction pressure in the production of hydrocarbons is 1 MPa or more, the activity of the catalyst for hydrocracking may be further increased, and when it is 10 MPa or less, the hydrogen consumption amount can be suppressed, and the increase of the operation cost can be suppressed. The reaction temperature is preferably 200° C. or more and 500° C. or less, and more preferably 250° C. or more and 400° C. or less. When the reaction temperature in the production of a hydrocarbon is 200° C. or more, the activity of the catalyst for hydrocracking may be further increased, and when it is 500° C. or less, the deterioration of the catalyst due to aggregation of the metal species which may be caused by the heat can be suppressed.

The reaction time in the production of hydrocarbons in the case where a batch reaction apparatus is used is preferably 0.5 hour or more and 5 hours or less, and more preferably 1 hour or more and 3 hours or less. When the reaction time is 0.5 hour or more, hydrocarbons having a smaller amount of oxygen components can be produced, and when the reaction time is 5 hours or less, hydrocarbons can be produced more efficiently. In the case where a flow reaction apparatus is used, the LHSV (liquid hourly space velocity) may be 0.05 $h^{-1}$ or more and 20 $h^{-1}$ or less, and more preferably 0.1 $h^{-1}$ or more and 10 $h^{-1}$ or less. When the LHSV is 0.05 $h^{-1}$ or more, hydrocarbons can be produced more efficiently, and when the LHSV is 20 $h^{-1}$ or less, hydrocarbons having a smaller amount of oxygen components can be produced. The hydrogen/oil ratio in the production of hydrocarbons is preferably 100 NL/L or more and 2,000 NL/L or less, and more preferably 500 NL/L or more and 1,500 NL/L or less. When the hydrogen/oil ratio is 100 NL/L or more, the activity of the catalyst for hydrocracking may be further increased, and when the hydrogen/oil ratio is 2,000 NL/L or less, the increase of the operation cost can be suppressed. In the hydrocarbon production method of the present invention, the catalyst for hydrocracking that is excellent in deoxidation capability is used, and thus hydrocarbons having a small amount of oxygen components can be produced.

EXAMPLE

The present invention will be described in more detail with reference to examples and comparative examples, but the present invention is not limited to the examples.

The hydrocarbons obtained in the examples and the comparative examples described later were subjected to the following evaluation.

Deoxidation Ratio and Light Component Amount

A product, which was a hydrocarbon thus produced, was dissolved in carbon disulfide, and the product was recovered. The total mass of the product was calculated by subtracting the weight of the vacant glass inner tube and the charged catalyst from the weight of the glass inner tube containing the catalyst and the reaction liquid after the reaction. The product thus recovered was measured for the mass of oxygen-containing compounds in the product, the mass of the total paraffins thus formed, and the mass of the fraction of C9 or less in the paraffins thus formed, by using a gas chromatography-hydrogen ionization detector (GC-FID) (Model 7890A, produced by Agilent Technologies, Inc.). The deoxidation ratio and the light component ratio were calculated by the following expressions.

deoxidation ratio (%)=((total mass of product)−(mass of oxygen-containing compound))/(total mass of product)×100 light component amount (%)=(mass of fraction of C9 or less in formed paraffins)/(mass of formed total paraffins)×100

Sulfur Component on Catalyst

The sulfur component on the catalyst was measured by a combustion-ultraviolet fluorescence method by using an ultraviolet fluorescence method sulfur analyzer (Model TS-100, produced by Mitsubishi Chemical Analytech Co., Ltd.). The minimum detection limit was 0.1% by mass.

Example 1

A solution of molybdenum and nickel (molybdenum-nickel impregnation liquid) and a solution of nickel (nickel impregnation liquid) were prepared, then a carrier was impregnated with the molybdenum-nickel impregnation liquid and the nickel impregnation liquid, and the carrier having been impregnated with the impregnation liquids was dried, calcined and pulverized, thereby preparing a catalyst precursor having nickel and molybdenum supported thereon. The catalyst precursor was then subjected to a hydrogen reduction treatment by using hydrogen, thereby providing a catalyst for hydrocracking. Subsequently, oleic acid as a model substance was hydrocracked by using the catalyst for hydrocracking, thereby producing hydrocarbons. The details are shown below.

Preparation of Catalyst for Hydrocracking

Preparation of Molybdenum-Nickel Impregnation Liquid 100 g of molybdenum oxide (produced by Wako Pure Chemical Industries, Ltd.) and 34.2 g of basic nickel carbonate (produced by Wako Pure Chemical Industries, Ltd.) were weighed in a 1,000 mL beaker, to which 300 g of ion exchanged water was added. The beaker was mounted on an agitator having agitation blades, and the content thereof was agitated under heating at 80° C. The heating time was 1 hour. Thereafter, 13.0 g of a phosphoric acid aqueous solution having a concentration of 85% (produced by Wako Pure Chemical Industries, Ltd.) was added to the solution, which was further heated at 80° C. for 2 hours. At this time, molybdenum oxide and basic nickel carbonate were dissolved to form a uniform solution. The solution was concentrated to approximately 100 mL, and then ion exchanged water was added thereto to make 130 mL, thereby preparing a molybdenum-nickel impregnation liquid.

Preparation of Nickel Impregnation Liquid 77.1 g of nickel nitrate hexahydrate (produced by Kanto Chemical Co., Inc.) was weighed in a 300 mL beaker, to which 50 mL of ion exchanged water was added, and the content was agitated until a uniform solution was formed. Ion exchanged water was added thereto to make 100 mL, thereby preparing a nickel impregnation liquid.

Supporting Metals on Carrier

The carrier used was γ-alumina, produced by JGC Catalysts and Chemicals, Ltd. The carrier was molded into a quadrilobe shape in advance and used. The supporting method to the carrier used was the incipient wetness method, which was an ordinary supporting method. The molybdenum-nickel impregnation liquid and the nickel impregnation liquid were measured by 18 cc and 70 cc, respectively. Thereafter, the two solutions were mixed and diluted with ion exchanged water, and the carrier in a net weight of 100 g except for the water content was impregnated therewith. The amount of water used for diluting was calculated from the values of the water content and the water absorption ratio of the carrier. The water content was measured with Kett Moisture Tester (Model FD-600, produced by Kett Electric Laboratory Co., Ltd.). The water absorption ratio was measured from the amount of water absorbed by 3 g of the carrier. Agitation was well performed to make the impregnation liquid adapted to the carrier, and then the carrier impregnated with the impregnation liquid was dried by heating at 35° C. for 20 minutes and then heating at 70° C. for 1 hour, under deaeration by using an evaporator (Model N-1000, produced by Tokyo Rikakikai Co., Ltd.). The ratio of the molybdenum-nickel impregnation liquid and the nickel impregnation liquid for impregnation was controlled to make $NiO/MoO_3$=12.6/10.5 (% by mass). At this time, the ratio of the content of nickel in terms of nickel oxide (NiO) to the sum of the content of nickel in terms of nickel oxide (NiO) and the content of molybdenum in terms of molybdenum oxide ($MoO_3$) was 0.55.

The carrier having been impregnated was dried at 120° C. for 8 hours and then calcined at 500° C. for 12 hours by using a calcination furnace (Model KM-600, produced by Advantec Toyo Kaisha, Ltd.). The temperature increasing rate on baking was 8° C. per minute. After calcining the impregnated carrier, the carrier was pulverized and granulated with a mesh of from 500 to 1,000 μm, thereby preparing a catalyst precursor.

Hydrogen Reduction Treatment

A hydrogen reduction treatment was performed as a pretreatment to the catalyst. 0.25 g of the catalyst was weighed and subjected to a hydrogen reduction treatment under a hydrogen stream with a flow reaction apparatus under the following condition. In the hydrogen reduction treatment, the hydrogen flow rate was 100 cc/min, and the hydrogen partial pressure was 0.2 MPa. In the hydrogen reduction treatment, the treating temperature was 400° C., the temperature increasing rate was 7° C. per minute, and the treating time was 2 hours.

Production of Hydrocarbon

As a raw material fat or oil, oleic acid (produced by Wako Pure Chemical Industries, Ltd.), which was a C18 fatty acid having one unsaturated bond, was used. This is because it is known that for a triacylglycerol, the reaction after hydrocracking to a fatty acid is rate-controlling, as described in Baoxiang Peng, et al., J. Am. Chem. Soc., Vol. 134, pp. 9400-9405 (2012) or the like.

The raw material fat or oil was hydrocracked by using a swing type autoclave reaction apparatus, produced by Tamaseiki Industries, Co., Ltd. This batch reaction apparatus can achieve a high agitation efficiency by swinging the entire apparatus. 1.50 g of oleic acid (raw material fat or oil) was introduced to the glass inner tube of the apparatus, to which the catalyst for hydrocracking subjected to the hydrogen reduction treatment was quickly introduced, and the catalyst was liquid-sealed. The glass inner tube having the catalyst for hydrocracking introduced was installed in the reaction apparatus, which was sealed. Hydrogen at a hydrogen partial pressure of 5 MPa was introduced thereto, and the glass inner tube was fixed to the reaction apparatus. The hydrogen/oil ratio was 1,200 NL/L. The temperature of the reaction apparatus was increased to the reaction temperature in a still state. The reaction temperature was 350° C., and the temperature increasing rate was 5° C. per minute. The total pressure was 7.5 MPa at the reaction temperature. After confirming that the temperature reached the prescribed temperature, swinging of the reaction apparatus was started to start the reaction. The reaction time was 1.0 hour. After 1 hour from the start of the reaction, the swinging of the reaction apparatus was terminated to terminate the reaction.

After completing the reaction, the reaction tube was quickly taken out from the reaction apparatus, and allowed to cool at room temperature. Thereafter, the glass inner tube was recovered. The product in the glass inner tube was dissolved in 6 mL of carbon disulfide, and the product (hydrocarbons) was recovered.

Example 2

A catalyst for hydrocracking was prepared, and hydrocarbons were produced by using the catalyst, in the same manner as in Example 1 except that the ratio of the molybdenum-nickel impregnation liquid and the nickel impregnation liquid was changed to make a compositional ratio of nickel and molybdenum $NiO:MoO_3$=18.0:6.0 (% by mass). At this time, the ratio of the content of nickel in terms of nickel oxide (NiO) to the sum of the content of nickel in terms of nickel oxide (NiO) and the content of molybdenum in terms of molybdenum oxide ($MoO_3$) was 0.75.

Example 3

A catalyst for hydrocracking was prepared, and hydrocarbons were produced by using the catalyst, in the same manner as in Example 1 except that a mixture of 50% by mass of β-zeolite, produced by Clariant Catalysts (Japan) K.K., and 50% by mass of γ-alumina, produced by JGC Catalysts and Chemicals, Ltd., was used as the carrier instead of γ-alumina, and the reaction temperature was changed to 300° C. The β-zeolite used had $SiO_2/Al_2O_3$=50 (molar ratio).

Example 4

A catalyst for hydrocracking was prepared, and hydrocarbons were produced by using the catalyst, in the same manner as in Example 3 except that the ratio of the molybdenum-nickel impregnation liquid and the nickel impregnation liquid for impregnation was changed to make a compositional ratio of nickel and molybdenum $NiO:MoO_3$=18.0: 6.0 (% by mass). At this time, the ratio of the content of nickel in terms of nickel oxide (NiO) to the sum of the content of nickel in terms of nickel oxide (NiO) and the content of molybdenum in terms of molybdenum oxide ($MoO_3$) was 0.75.

Example 5

A catalyst for hydrocracking was prepared, and hydrocarbons were produced by using the catalyst, in the same manner as in Example 3 except that silica-alumina, produced by Sasol Japan K.K., was used as the carrier instead of the mixture of 50% by mass of β-zeolite and 50% by mass of γ-alumina. The silica-alumina used had $SiO_2/Al_2O_3=1.5$ (molar ratio).

Example 6

A catalyst for hydrocracking was prepared, and hydrocarbons were produced by using the catalyst, in the same manner as in Example 3 except that a mixture of 50% by mass of silica-alumina, produced by Sasol Japan K.K., 20% by mass of ultrastabilized Y-type zeolite formed by subjecting Y-type zeolite to an iron sulfate treatment (Fe-USY zeolite), and 30% by mass of γ-alumina, produced by JGC Catalysts and Chemicals, Ltd., was used as the carrier instead of the mixture of 50% by mass of β-zeolite and 50% by mass of γ-alumina. The silica-alumina used had $SiO_2/Al_2O_3=1.5$ (molar ratio). The Fe-USY zeolite used had $SiO_2/Al_2O_3=50$ (molar ratio).

The preparation method of the Fe-USY zeolite is shown below. Y-type zeolite ($SiO_2/Al_2O_3=5.2$ (molar ratio)), produced by JGC Catalysts and Chemicals, Ltd., was subjected twice to a cycle of an ammonium ion exchange and a steaming treatment. The steaming treatment was performed at 580° C. to provide ultrastable Y-type zeolite (USY zeolite). 10 kg of USY zeolite was suspended in 115 L of pure water, and then the suspension liquid was heated to 75° C. and agitated for 30 minutes. Subsequently, 13.7 kg of a 10% by mass sulfuric acid solution was added to the suspension liquid, 11.5 kg of a ferric sulfate solution having a concentration of 0.57 mol/L was further added thereto, and after agitating for 30 minutes after the addition, the suspension liquid was filtered and rinsed, thereby providing Fe-USY zeolite.

Example 7

A catalyst for hydrocracking was prepared, and hydrocarbons were produced by using the catalyst, in the same manner as in Example 3 except that a mixture of 80% by mass of USY zeolite formed by subjecting Y-type zeolite, produced by JGC Catalysts and Chemicals, Ltd., to an ultrastabilization treatment, and 20% by mass of γ-alumina, produced by JGC Catalysts and Chemicals, Ltd., was used as the carrier instead of the mixture of 50% by mass of β-zeolite and 50% by mass of γ-alumina. The silica-alumina used had $SiO_2/Al_2O_3=1.5$ (molar ratio). The USY zeolite used had $SiO_2/Al_2O_3=50$ (molar ratio). The USY zeolite was prepared in the same manner as in Example 6.

Example 8

A catalyst for hydrocracking was prepared, and hydrocarbons were produced by using the catalyst, in the same manner as in Example 3 except that a mixture of 40% by mass of silica-alumina, Sasol Japan K.K., 30% by mass of USY zeolite formed by subjecting Y-type zeolite, produced by JGC Catalysts and Chemicals, Ltd., to an ultrastabilization treatment, and 30% by mass of γ-alumina, produced by JGC Catalysts and Chemicals, Ltd., was used as the carrier instead of the mixture of 50% by mass of β-zeolite and 50% by mass of γ-alumina. The silica-alumina used had $SiO_2/Al_2O_3=1.5$ (molar ratio). The USY zeolite used had $SiO_2/Al_2O_3=50$ (molar ratio). The USY zeolite was prepared in the same manner as in Example 6.

Example 9

Hydrocarbons were produced in the same manner as in Example 3 except that a jatropha oil, provided by Nippon Biodiesel Fuel Co., Ltd., was used as the raw material fat or oil.

Example 10

Hydrocarbons were produced in the same manner as in Example 5 except that a jatropha oil, provided by Nippon Biodiesel Fuel Co., Ltd., was used as the raw material fat or oil.

Example 11

Hydrocarbons were produced in the same manner as in Example 3 except that a cashew nut shell oil (Item No. CX-1000, produced by Cashew Co., Ltd.) was used as the raw material fat or oil.

Example 12

Hydrocarbons were produced in the same manner as in Example 5 except that a cashew nut shell oil (Item No. CX-1000, produced by Cashew Co., Ltd.) was used as the raw material fat or oil.

Comparative Example 1

A catalyst for hydrocracking was prepared, and hydrocarbons were produced by using the catalyst, in the same manner as in Example 1 except that the nickel impregnation liquid was not used, but only the molybdenum-nickel impregnation liquid was used. The compositional ratio of nickel and molybdenum was $NiO:MoO_3=4.2:21.0$ (% by mass), and the ratio of the content of nickel in terms of nickel oxide (NiO) to the sum of the content of nickel in terms of nickel oxide (NiO) and the content of molybdenum in terms of molybdenum oxide ($MoO_3$) was 0.17.

Comparative Example 2

A catalyst for hydrocracking was prepared, and hydrocarbons were produced by using the catalyst, in the same manner as in Example 1 except that the molybdenum-nickel impregnation liquid was not used, but only the nickel impregnation liquid was used. The compositional ratio of nickel and molybdenum was $NiO:MoO_3=25.0:0.0$ (% by mass), and the ratio of the content of nickel in terms of nickel oxide (NiO) to the sum of the content of nickel in terms of nickel oxide (NiO) and the content of molybdenum in terms of molybdenum oxide ($MoO_3$) was 1.00.

Comparative Example 3

A catalyst for hydrocracking was prepared, and hydrocarbons were produced by using the catalyst, in the same manner as in Example 3 except that the nickel impregnation liquid was not used, but only the molybdenum-nickel impregnation liquid was used. The compositional ratio of nickel and molybdenum was $NiO:MoO_3=4.2:21.0$ (% by mass), and the ratio of the content of nickel in terms of nickel oxide (NiO) to the sum of the content of nickel in terms of nickel oxide (NiO) and the content of molybdenum in terms of molybdenum oxide ($MoO_3$) was 0.17.

Comparative Example 4

A catalyst for hydrocracking was prepared, and hydrocarbons were produced by using the catalyst, in the same manner as in Example 3 except that the molybdenum-nickel impregnation liquid was not used, but only the nickel impregnation liquid was used. The compositional ratio of nickel and molybdenum was $NiO:MoO_3=25.0:0.0$ (% by mass), and the ratio of the content of nickel in terms of nickel oxide (NiO) to the sum of the content of nickel in terms of nickel oxide (NiO) and the content of molybdenum in terms of molybdenum oxide ($MoO_3$) was 1.00.

Comparative Example 5

A catalyst for hydrocracking was prepared, and hydrocarbons were produced by using the catalyst, in the same manner as in Example 3 except that the nickel impregnation liquid was not used, but only the molybdenum-nickel impregnation liquid was used, and instead of the hydrogen reduction treatment, 110 μL of dimethylsulfide was introduced to 0.25 g of the catalyst precursor, which was subjected to a preliminary sulfurization treatment at a temperature of 300° C. for 2 hours. The compositional ratio of nickel and molybdenum was $NiO:MoO_3=4.2:21.0$ (% by mass), and the ratio of the content of nickel in terms of nickel oxide (NiO) to the sum of the content of nickel in terms of nickel oxide (NiO) and the content of molybdenum in terms of molybdenum oxide ($MoO_3$) was 0.17. The catalyst had a content of sulfur of 7.9% by mass.

Comparative Example 6

A catalyst for hydrocracking was prepared, and hydrocarbons were s produced by using the catalyst, in the same manner as in Example 1 except that the nickel impregnation liquid was not used, but only the molybdenum-nickel impregnation liquid was used, instead of the hydrogen reduction treatment, 110 μL of dimethylsulfide was introduced to 0.25 g of the catalyst precursor, which was subjected to a preliminary sulfurization treatment at a temperature of 300° C. for 2 hours, and the reaction temperature in the production of hydrocarbons was changed to 300° C. The compositional ratio of nickel and molybdenum was $NiO:MoO_3=4.2:21.0$ (% by mass), and the ratio of the content of nickel in terms of nickel oxide (NiO) to the sum of the content of nickel in terms of nickel oxide (NiO) and the content of molybdenum in terms of molybdenum oxide ($MoO_3$) was 0.17. The catalyst had a content of sulfur of 8.1% by mass.

Comparative Example 7

Hydrocarbons were produced in the same manner as in Comparative Example 1 except that a jatropha oil, produced by Nippon Biodiesel Fuel Co., Ltd., was used as the raw material fat or oil, and the reaction temperature was changed to 300° C.

Comparative Example 8

Hydrocarbons were produced in the same manner as in Comparative Example 6 except that a jatropha oil, produced by Nippon Biodiesel Fuel Co., Ltd., was used as the raw material fat or oil.

Comparative Example 9

Hydrocarbons were produced in the same manner as in Comparative Example 1 except that a cashew nut shell oil (Item No. CX-1000, produced by Cashew Co., Ltd.) was used as the raw material fat or oil, and the reaction temperature was changed to 300° C.

Comparative Example 10

Hydrocarbons were produced in the same manner as in Comparative Example 6 except that a cashew nut shell oil (Item No. CX-1000, produced by Cashew Co., Ltd.) was used as the raw material fat or oil.

The compositions of the supported metals of the catalyst precursors and the compositions of the carriers obtained in Examples 1 to 12 and Comparative Examples 1 to 10 are shown in Table 1.

TABLE 1

| | Supported metals | | NiO/ | Carrier | | | | |
|---|---|---|---|---|---|---|---|---|
| | NiO (X) (% by mass) | $MoO_3$ (Y) (% by mass) | ($NiO + MoO_3$) (X/(X + Y)) | γ-Alumina (% by mass) | β-Zeolite (% by mass) | Silica-alumina (% by mass) | USY zeolite (% by mass) | Fe-USY zeolite (% by mass) |
| Example 1 | 12.6 | 10.5 | 0.55 | 100 | — | — | — | — |
| Example 2 | 18.0 | 6.0 | 0.75 | 100 | — | — | — | — |
| Example 3 | 12.6 | 10.5 | 0.55 | 50 | 50 | — | — | — |
| Example 4 | 18.0 | 6.0 | 0.75 | 50 | 50 | — | — | — |
| Example 5 | 12.6 | 10.5 | 0.55 | — | — | 100 | — | — |
| Example 6 | 12.6 | 10.5 | 0.55 | 30 | — | 50 | — | 20 |
| Example 7 | 12.6 | 10.5 | 0.55 | 20 | — | — | 80 | — |
| Example 8 | 12.6 | 10.5 | 0.55 | 30 | — | 40 | 30 | — |
| Example 9 | 12.6 | 10.5 | 0.55 | 50 | 50 | — | — | — |
| Example 10 | 12.6 | 10.5 | 0.55 | — | — | 100 | — | — |
| Example 11 | 12.6 | 10.5 | 0.55 | 50 | 50 | — | — | — |
| Example 12 | 12.6 | 10.5 | 0.55 | — | — | 100 | — | — |
| Comparative Example 1 | 4.2 | 21.0 | 0.17 | 100 | — | — | — | — |
| Comparative Example 2 | 25.0 | 0.0 | 1.00 | 100 | — | — | — | — |
| Comparative Example 3 | 4.2 | 21.0 | 0.17 | 50 | 50 | — | — | — |
| Comparative Example 4 | 25.0 | 0.0 | 1.00 | 50 | 50 | — | — | — |

TABLE 1-continued

| | Supported metals | | NiO/ | Carrier | | | | |
|---|---|---|---|---|---|---|---|---|
| | NiO (X) (% by mass) | MoO₃ (Y) (% by mass) | (NiO + MoO₃) (X/(X + Y)) | γ-Alumina (% by mass) | β-Zeolite (% by mass) | Silica-alumina (% by mass) | USY zeolite (% by mass) | Fe-USY zeolite (% by mass) |
| Comparative Example 5 | 4.2 | 21.0 | 0.17 | 50 | 50 | — | — | — |
| Comparative Example 6 | 4.2 | 21.0 | 0.17 | 100 | — | — | — | — |
| Comparative Example 7 | 4.2 | 21.0 | 0.17 | 100 | — | — | — | — |
| Comparative Example 8 | 4.2 | 21.0 | 0.17 | 100 | — | — | — | — |
| Comparative Example 9 | 4.2 | 21.0 | 0.17 | 100 | — | — | — | — |
| Comparative Example 10 | 4.2 | 21.0 | 0.17 | 100 | — | — | — | — |

The evaluation results of the hydrocarbons obtained in Examples 1 and 2 and Comparative Examples 1 and 2 are shown in Table 2, the evaluation results of the hydrocarbons obtained in Examples 3 to 8 and Comparative Examples 3 to 6 are shown in Table 3, the evaluation results of the hydrocarbons obtained in Examples 9 and 10 and Comparative Examples 7 and 8 are shown in Table 4, and the evaluation results of the hydrocarbons obtained in Examples 11 and 12 and Comparative Examples 9 and 10 are shown in Table 5. As described in the foregoing, in Examples 1 and 2 and Comparative Examples 1 and 2, the raw material fat or oil was oleic acid, and the reaction temperature was 350° C.; in Examples 3 to 8 and Comparative Examples 3 to 6, the raw material fat or oil was oleic acid, and the reaction temperature was 300° C.; in Examples 9 and 10 and Comparative Examples 7 and 8, the raw material fat or oil was a jatropha oil, and the reaction temperature was 300° C.; and in Examples 11 and 12 and Comparative Examples 9 and 10, the raw material fat or oil was a cashew nut shell oil, and the reaction temperature was 300° C.

TABLE 2

| | Deoxidation ratio (%) | Light component amount (%) | Sulfur component on catalyst (% by mass) |
|---|---|---|---|
| Example 1 | 65.3 | 0.5 | <0.1 |
| Example 2 | 52.7 | 0.5 | <0.1 |
| Comparative Example 1 | 17.2 | 0.8 | <0.1 |
| Comparative Example 2 | 12.3 | 1.3 | <0.1 |

TABLE 3

| | Deoxidation ratio (%) | Light component amount (%) | Sulfur component on catalyst (% by mass) |
|---|---|---|---|
| Example 3 | 97.5 | 5.0 | <0.1 |
| Example 4 | 96.8 | 4.8 | <0.1 |
| Example 5 | 94.9 | 2.9 | <0.1 |
| Example 6 | 84.0 | 1.8 | <0.1 |
| Example 7 | 89.5 | 1.2 | <0.1 |
| Example 8 | 69.6 | 0.6 | <0.1 |
| Comparative Example 3 | 39.1 | 7.2 | <0.1 |
| Comparative Example 4 | 33.9 | 9.7 | <0.1 |
| Comparative Example 5 | 32.3 | 11.2 | 7.9 |
| Comparative Example 6 | 32.1 | 4.4 | 8.1 |

TABLE 4

| | Deoxidation ratio (%) | Light component amount (%) | Sulfur component on catalyst (% by mass) |
|---|---|---|---|
| Example 9 | 99.3 | 6.9 | <0.1 |
| Example 10 | 98.3 | 6.8 | <0.1 |
| Comparative Example 7 | 16.4 | 22.1 | <0.1 |
| Comparative Example 8 | 39.9 | 11.0 | 8.1 |

TABLE 5

| | Deoxidation ratio (%) | Light component amount (%) | Sulfur component on catalyst (% by mass) |
|---|---|---|---|
| Example 11 | 99.8 | 0.5 | <0.1 |
| Example 12 | 99.5 | 0.5 | <0.1 |
| Comparative Example 9 | 21.9 | 1.3 | <0.1 |
| Comparative Example 10 | 7.6 | 2.7 | 8.1 |

Results

The hydrocarbons obtained in Examples 1 and 2 exhibited higher deoxidation ratios than the hydrocarbons obtained in Comparative Examples 1 and 2. The hydrocarbons obtained in Examples 3 to 8 exhibited higher deoxidation ratios than the hydrocarbons obtained in Comparative Examples 3 to 6. The hydrocarbons obtained in Examples 9 and 10 exhibited higher deoxidation ratios than the hydrocarbons obtained in Comparative Examples 7 and 8. The hydrocarbons obtained in Examples 11 and 12 exhibited higher deoxidation ratios than the hydrocarbons obtained in Comparative Examples 9 and 10. It was found from the results that the catalysts for hydrocracking of the present invention were excellent in deoxidation capability, and the production of hydrocarbons by using the catalysts for hydrocracking of the present invention was able to produce hydrocarbons having a small amount of oxygen components. Hydrocarbons after subjecting to deoxidation reaction are generally subjected to isomerization and decomposition reaction for the purpose of lowering the pour point in the later process steps. There is a tendency that the carbon chain length of the hydrocarbon becomes shorter than the raw material due to the process of isomerization and decomposition reaction. Therefore, the carbon chain length derived from the fat or oil is desirably retained as much as possible in the deoxidation reaction. Accordingly, the light component amount in Tables 2 and 3 corresponds to a component having a shorter carbon chain than the naphtha fraction (for example, a hydrocarbon having a boiling point that is equal to or lower than n-nonane), and the amount of the light component amount is desirably small. The hydrocarbons obtained in Examples 1 and 2 exhibited lower light component amounts than the hydrocarbons obtained in Comparative Examples 1 and 2. The hydrocarbons obtained in Examples 3 to 8 exhibited lower light component amounts than the hydrocarbons obtained in Comparative Examples 3 to 5. The hydrocarbons obtained in Examples 9 and 10 exhibited lower light component amounts than the hydrocarbons obtained in Comparative Examples 7 and 8. The hydrocarbons obtained in Examples 11 and 12 exhibited lower light component amounts than the hydrocarbons obtained in Comparative Examples 9 and 10. It was understood from the results that the catalysts for hydrocracking of the present invention were able to produce hydrocarbons without shortening the carbon chain length.

INDUSTRIAL APPLICABILITY

The catalyst for hydrocracking of the present invention has a good deoxidation function, and, by using the same, a light gas oil fuel, a jet fuel and the like can be produced from a raw material, such as a vegetable fat or oil, an animal fat or oil, and a coal liquefaction oil.

The invention claimed is:
1. A catalyst for hydrocracking comprising a carrier containing a porous oxide comprising a solid acid oxide, and nickel and molybdenum supported on the carrier,
   wherein the catalyst for hydrocracking has been subjected to a hydrogen reduction treatment, and
   wherein the catalyst for hydrocracking has a mass ratio $(X/(X+Y))$ of a nickel content $(X)$ in terms of nickel oxide (NiO) to the sum of the nickel content $(X)$ in terms of nickel oxide (NiO) and a molybdenum content $(Y)$ in terms of molybdenum oxide ($MoO_3$) of 0.55 or more and 0.75 or less; and
   wherein the solid acid oxide is selected from the group consisting of zeolite, silica-alumina, alumina-boria, alumina-titania, silica-zirconia, silicoaluminophosphate and combinations thereof.
2. The catalyst for hydrocracking according to claim 1, wherein the catalyst for hydrocracking has a content of sulfur of 5% by mass or less based on the total amount of the catalyst for hydrocracking.
3. The catalyst for hydrocracking according to claim 1, wherein the porous oxide further comprises alumina.
4. The catalyst for hydrocracking according to claim 3, wherein the alumina is γ-alumina.
5. The catalyst for hydrocracking according to claim 1, wherein a mass ratio of the solid acid oxide is 10% by mass or more based on the total amount of the catalyst for hydrocracking.
6. A hydrocarbon production method, which comprises producing hydrocarbons from a vegetable fat or oil, an animal fat or oil, and/or a coal liquefaction oil, each containing at least one selected from the group consisting of a fatty acid, a fatty acid ester, and an alkylphenol compound, by using the catalyst for hydrocracking according to claim 1.

* * * * *